(12) United States Patent
Koo

(10) Patent No.: US 9,563,811 B2
(45) Date of Patent: Feb. 7, 2017

(54) CHARACTER RECOGNITION METHOD, CHARACTER RECOGNITION APPARATUS AND FINANCIAL APPARATUS

(71) Applicant: LG CNS CO., LTD., Seoul (KR)

(72) Inventor: Beum Yong Koo, Seoul (KR)

(73) Assignee: LG CNS CO., LTD., Seoul (KR)

( * ) Notice: Subject to any disclaimer, the term of this patent is extended or adjusted under 35 U.S.C. 154(b) by 136 days.

(21) Appl. No.: 13/955,782

(22) Filed: Jul. 31, 2013

(65) Prior Publication Data

US 2014/0037181 A1 Feb. 6, 2014

(30) Foreign Application Priority Data

Jul. 31, 2012 (KR) ........................ 10-2012-0083895
Jul. 24, 2013 (KR) ........................ 10-2013-0087482

(51) Int. Cl.
| | | |
|---|---|---|
| G06K 9/18 | (2006.01) | |
| G06K 9/34 | (2006.01) | |
| G06K 9/42 | (2006.01) | |
| G06K 9/68 | (2006.01) | |

(52) U.S. Cl.
CPC ................ *G06K 9/18* (2013.01); *G06K 9/342* (2013.01); *G06K 9/42* (2013.01); *G06K 9/6814* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 5,999,647 | A * | 12/1999 | Nakao et al. ................. | 382/187 |
| 7,092,567 | B2 * | 8/2006 | Ma et al. ...................... | 382/177 |
| 7,889,926 | B2 * | 2/2011 | Kimura et al. ............... | 382/182 |
| 8,417,017 | B1 * | 4/2013 | Beutel et al. ................. | 382/135 |
| 2004/0037456 | A1 * | 2/2004 | Haycock ............ | G06Q 20/1085 382/135 |
| 2004/0086179 | A1 | 5/2004 | Ma et al. | |
| 2005/0018906 | A1 * | 1/2005 | Napper ........................ | 382/186 |
| 2006/0054454 | A1 | 3/2006 | Oh | |
| 2006/0245650 | A1 * | 11/2006 | Jun et al. ...................... | 382/176 |
| 2007/0058856 | A1 * | 3/2007 | Boregowda et al. ......... | 382/159 |
| 2010/0202680 | A1 * | 8/2010 | Hamasaki et al. ............ | 382/137 |

(Continued)

FOREIGN PATENT DOCUMENTS

| | | |
|---|---|---|
| CN | 101809631 A | 8/2010 |
| CN | 101923741 A | 12/2010 |

(Continued)

OTHER PUBLICATIONS

International Patent Publication WO 2007/011188 A1.*
Office Action dated Mar. 30, 2016 in Chinese Application No. 201310329263.2.

*Primary Examiner* — Matthew Bella
*Assistant Examiner* — Soo Shin
(74) *Attorney, Agent, or Firm* — Saliwanchik, Lloyd & Eisenschenk

(57) ABSTRACT

A character recognition method for recognizing a character of a medium is provided. A character image of an individual character from a medium is acquired and the character image is read out step by step to determine the character according to a hierarchical structure in which a set of predetermined characters are hierarchically classified into a plurality of groups configured of main groups and sub groups.

17 Claims, 11 Drawing Sheets

(56) References Cited

U.S. PATENT DOCUMENTS

2014/0198967 A1     7/2014    Hamasaki et al.

FOREIGN PATENT DOCUMENTS

| | | |
|---|---|---|
| JP | H07-200736 A | 8/1995 |
| JP | 2002-342288 A | 11/2002 |
| KR | 10-0289641 B1 | 2/2001 |
| KR | 10-2004-0016597 A | 2/2004 |
| KR | 10-0719608 B1 | 5/2007 |
| KR | 10-2008-0083992 A | 9/2008 |
| KR | 10-0893613 B1 | 4/2009 |
| KR | 10-2011-0038478 A | 4/2011 |
| WO | WO-2007/011188 A1 | 1/2007 |

\* cited by examiner

CHARACTER RECOGNITION METHOD, CHARACTER RECOGNITION APPARATUS AND FINANCIAL APPARATUS

CROSS-REFERENCE TO RELATED APPLICATIONS

This application claims the benefit under 35 U.S.C. §119 of Korean Patent Application Nos. 10-2012-0083895, filed Jul. 31, 2012 and 10-2013-0087482, filed Jul. 24, 2013, which are hereby incorporated by reference in their entirety.

BACKGROUND

Field of the Invention

Embodiments of the inventive concept relate to a character recognition method, a character recognition apparatus, and a financing apparatus.

Description of Related Art

Financing apparatuses are apparatuses configured to process financing services, for example, to throw into or withdraw a medium such as a bank or a check, and it is important to accurately recognize characters included in the medium so as to increase reliability of the financing services.

In recent years, an optical character reading method has been widely used to increase accuracy in character recognition. However, the optical character reading method has advantage of accuracy of character recognition when quality of a scanned image is good, but has a disadvantage of degradation in accuracy of character recognition when the quality of the scanned image is poor. Therefore, there is a need for a character recognition method for recognizing characters of a medium accurately and rapidly even when quality of a scanned image is poor.

BRIEF SUMMARY

Embodiments of the inventive concept provide a character recognition method, a character recognition apparatus, and a financing apparatus which accurately recognizes characters of a medium.

The technical objectives of a character recognition method, a character recognition apparatus, and a financing apparatus are not limited to the above disclosure; other objectives may become apparent to those of ordinary skill in the art based on the following descriptions.

In accordance with an aspect of the inventive concept, a character recognition method includes acquiring a character image of an individual character from a medium; and reading out the character image step by step to determine the character according to a hierarchical structure in which a set of predetermined characters are hierarchically classified into a plurality of groups configured of main groups and sub groups.

In accordance with an aspect of the inventive concept, a character recognition apparatus includes: an image acquisition unit configured to acquire a character image of an individual character from a medium; and a character determination unit configured to determine the individual character from the character image of the individual character. The character determination unit may determine a predetermined Alphabet character on the same digit of different media in a set of predetermined number characters when the determination of the individual character is performed on the other mediums a predetermined times or more.

In accordance with an aspect of the inventive concept, a character recognition apparatus includes: an image acquisition unit configured to acquire a character image of an individual character from a first country's bill; and a character determination unit configured to determine the individual character from the character image of the individual character. When an Alphabet character of a serial number of a second country's bill is replaced on a number character digit of a serial number of the first country's bill, the character determination unit 220 determines the Alphabet character of the serial number of the second country's bill as a number in a set including one or more among numbers 0 to 9.

In accordance with an aspect of the inventive concept, a financing apparatus includes: a medium input/output unit configured to deposit or withdraw a medium including characters; a character recognition apparatus configured to acquire a character image of an individual character from the medium, and read out the character image to determine the characters according to a hierarchic structure in which a set of predetermined characters is hierarchically classified into a plurality of groups configured of main groups and sub groups; and a controller configured to control operations of the medium input/output unit and the character recognition apparatus.

In accordance with an aspect of the inventive concept, a financing apparatus includes: a medium input/output unit configured to deposit or withdraw a medium in which different kinds of characters having different sizes are included; and a character recognition apparatus configured to acquire an image of the medium, acquire a character sting image from the acquired image, and acquire an character image of an individual character based on the character string image to determine the individual character from the character image.

Details of other embodiments are included in the detailed description and drawings.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION

Figure 1:
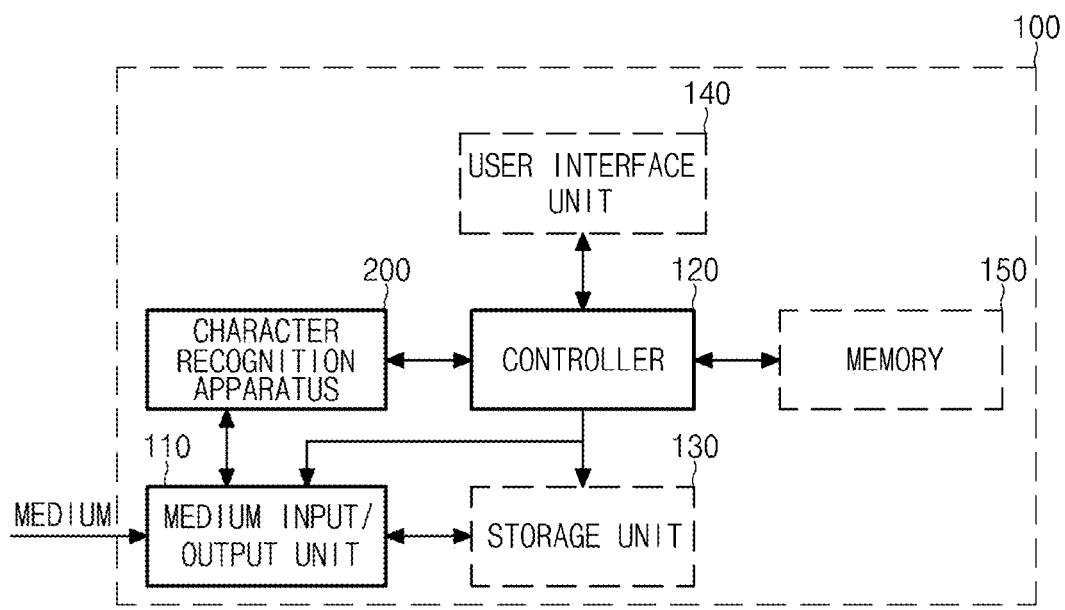
FIG. 1 is a block diagram illustrating a financing apparatus according to an embodiment of the inventive concept.

Hereinafter, exemplary embodiments of the present disclosure will be described with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

A financial device according to embodiments is a device that performs financial businesses, i.e., medium processing comprising processing such as deposit processing, giro receipt, or gift certificate exchange and/or processing such as withdrawal processing, giro dispensing, or gift certificate dispensing by receiving various medium such as, e.g., paper moneys, bills, giros, coins, gift certificates, etc. For example, the financial device may comprise an automatic teller machine (ATM) such as a cash dispenser (CD) or a cash recycling device. However, the financial device is not limited to the above-described examples. For example, the financial device may be a device for automatically performing the financial businesses such as a financial information system (FIS).

Hereinafter, assuming that the financial device is the ATM, an embodiment will be described. However, this assumption is merely for convenience of description, and technical idea of the present disclosure is not limited to the ATM.

FIG. 1 is a block diagram illustrating a financing apparatus according to an embodiment of the inventive concept. Referring to FIG. 1, a financing apparatus 100 includes a medium input/output unit 110, a controller 120, and a character recognition apparatus 200. The financing apparatus 100 may further include a storage unit 130, a user interface unit 140, or a memory 150.

The medium input/output unit 110 leads in or withdraws a medium. For example, the medium may be paper moneys, checks, giros, gift certificates, etc, but is not limited thereto. The medium input/output unit 110 may further include a sensor configured to determine whether or not the medium is led in or withdrawn.

The character recognition apparatus 200 recognizes and determines a character. For example, the character recognition apparatus 200 may determine the character using an optical character reading method. The character recognition apparatus 200 may acquire an image of the medium in a manner of radiating light emitted from a light source to the medium, and receiving light reflected from the medium or the light transmitted in the medium. The character recognition apparatus 200 determines a character included in the medium using the acquired image of the medium. Detailed description related thereto will be described with reference to FIG. 2.

Further, the character recognition apparatus 200 may acquire character field information using the acquired image of medium. The character recognition apparatus 200 may acquire the character field information to determine a kind of a medium, a medium state, and the like. The character field information may include an image for a series of one or more character.

The controller 120 controls an overall operation of the financing apparatus 100. That is, the controller 120 controls the medium input/output unit 110 to lead-in or withdraw a medium, controls the character recognition apparatus 200 to recognize the medium and determine characters printed on the medium, controls the storage unit 130 to store the led-in and recognized medium or controls the medium stored in the storage unit 130 to be released and to be withdrawn through the medium input/output unit 110, and controls the user interface unit 140 to receive a command or data such information from a user and to display the information to the user.

For example, the controller 120 may control the character recognition apparatus 200 to determine the characters printed on the medium when it is detected that the medium put in the medium input/output unit 110 is transferred to the character recognition apparatus 200 from the medium input/output unit 110.

The controller 120 according to an embodiment may correspond to at least one processor or include at least one processor. Thus, the controller 120 may be driven in a form included in another hardware apparatus such as a microprocessor or a general-purposed computer system.

The storage unit 130 stores the medium. For example, the storage unit 130 may receive and store the medium led in from the medium input/output unit 110 or transfer the stored medium to the medium input/output unit 110 to be withdrawn.

The user interface unit 140 acquires input information from the user and displays output information to the user. For example, the user interface unit 140 may display characters recognized in the character recognition apparatus 200 to the user or display that a character recognition error is generated when character recognition is failed in the character recognition apparatus 200. Alternatively, the user interface unit 140 may display a processing state of the medium of the financing apparatus 100. Further, the user interface unit 140 may receive character information for designating characters in which the character recognition is failed if necessary.

The user interface 140 may include all an input/output devices such as a display panel, a touch screen, a monitor, a keyboard, a speaker or a software module configured to drive the input/output devices.

The memory 150 stores pieces of information required for character recognition. For example, the memory 150 may store a hierarchical structure in which a set of predetermined characters is hierarchically classified into a plurality of groups including upper groups and lower groups, conditions for reading character images step by step according to the hierarchical structure, a template required for character read-out, and the like. The template and the like may not be independently stored in the memory but may be included in a program for character read-out and stored in a program form in the memory 150. Further, the memory 150 may store characters recognized by the character recognition apparatus 200.

The memory 150 according to an embodiment of the inventive concept is a conventional storage medium, and the person having ordinary skilled in the art related to the embodiment would understand that the memory 150 may be implemented as a hard disk drive (HDD), a read only memory (ROM), a random access memory (RAM), a flash memory, a memory card, a solid state drive (SDD), or the like.

Figure 2:
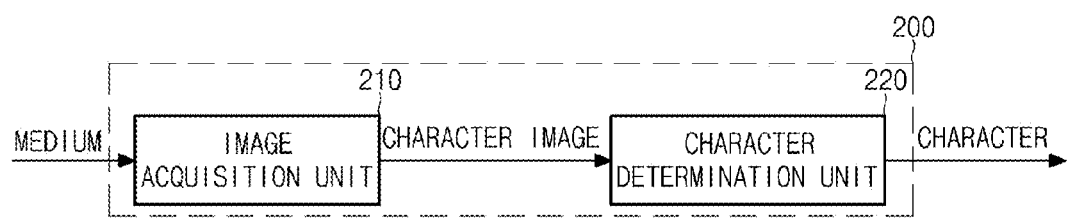
FIG. 2 is a block diagram illustrating a character recognition apparatus according to an embodiment of the inventive concept.

FIG. 2 is a block diagram illustrating a character recognition apparatus according to an embodiment of the inventive concept. Referring to FIG. 2, a character recognition apparatus 200 is an apparatus configured to recognize characters included in a medium, and may include an image acquisition unit 210 and a character determination unit 220. Contents described in relation to the character recognition apparatus 200 of FIG. 1 may be applied to the character recognition apparatus 200 of FIG. 2, and repeated description thereof will be omitted.

The character recognition apparatus 200 according to an embodiment may correspond to at least one processor or include at least one processor. Thus, the character recognition apparatus 200 may be driven in a form in which the character recognition apparatus 200 is included in another hardware apparatus such as a microprocessor or a general-purpose computer system.

The image acquisition unit 210 and the character determination unit 220 may be driven by one processor included in the character recognition apparatus 200 or may be driven independently by respective processors.

Figure 7:
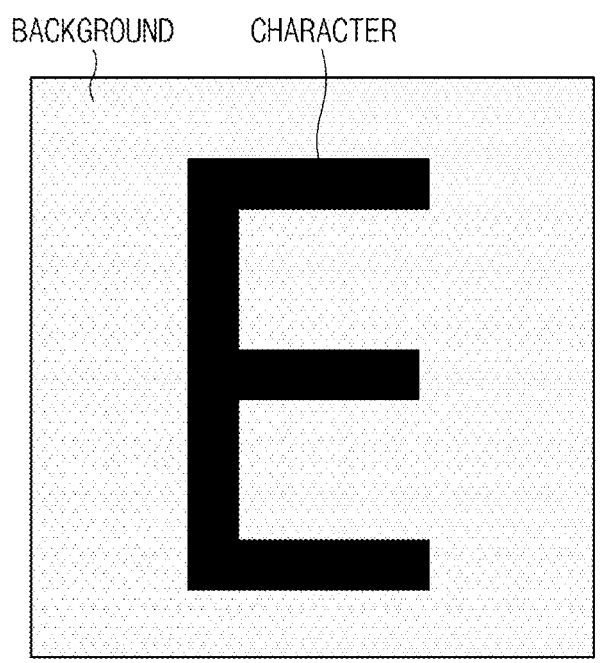
FIG. 7 is a view explaining a character image according to an embodiment of the inventive concept.

The image acquisition unit 210 acquires a character image of an individual character from a medium. An example of the character image of the individual character is illustrated in FIG. 7. The image acquisition unit 210 may acquire an image of the medium using light. Thus, the image acquisition unit 210 may include a light-emitting unit including a light source and a light-receiving unit.

According to an embodiment, the image acquisition unit 210 may acquire the image of the medium, acquire a character string image from the image of the acquired image of the medium, and acquires the character image of the individual character based on the character string image. When the image acquisition unit 210 acquires the image of the medium, the image acquisition unit 210 may acquire not the whole image of the medium but an image of a specific portion of the medium. Further, the image may acquire a plurality of images with respect to one medium.

The image acquisition unit 210 may acquire the image of the medium using printing locations or character sizes of the characters printed on the medium.

The image acquisition unit 210 may acquire a character string image by performing image correction on the acquire image of the medium.

For example, the image correction of removing a margin surrounding the character string from the acquired image of the medium, inverting color of the acquired image of the medium, or equalizing sizes of characters having different sizes from each other included in the acquired image of the medium may be performed. The image acquisition unit 210 may further perform imaging sharpening for sharpening the acquired image of the medium.

The image acquisition unit 210 may further include an operation for classifying any one of the acquired image of the medium, a character string image, and a character image of an individual character into a plurality of pixels. In the embodiment, the image acquisition unit 210 may further include an image processing apparatus configured to perform image correction. Detailed description related thereto will be described with reference to FIGS. 3 to 5.

The character determination 220 determines an individual character from the character image of the individual character acquired by the image acquisition unit 220. The character determination unit 220 may determine the individual character from the character image of the individual character using information stored in the memory 150.

In an embodiment, the character determination unit 220 may determine the character using a color value of each of the plurality of pixels in the individual character image classified into the plurality of pixels. The character determination unit 220 may determine the character using gray values or brightness values of the pixels in addition to colors of the pixels. Here, the color values, the gray values, the brightness values, or the like may be pixel values. For example, the character determination unit 220 may determine the character by comparing the color of each of pixel in the character image of the individual character classified into the plurality of pixels with information stored in the memory 150.

In another embodiment, the character determination unit 120 may determine the character using a template preset in the character image of the individual character classified into the plurality of pixels. A size of the template is equal to a size in which two or more pixels are added, a plurality of templates for determining the individual character may be included, and sizes of the plurality of templates may be different. The plurality of templates may be pre-generated by considering a font and a font size of the character printed on the medium and pre-stored in the memory 150. Shapes or the number of the templates may be changed according to the kind of character. Detailed description related thereto will be described with reference to FIG. 5.

In another embodiment, the character determination unit 220 determines a character by read out the character according to the hierarchical structure. The hierarchical structure hierarchically classifies a set of predetermined characters into the plurality of group configured of the main groups and the sub groups. Here, characters included in a main group include characters included in a sub group of a corresponding main group. The hierarchical structure may classify the set of the predetermined characters into the plurality of groups configured of the main groups and the sub groups based on similarity of shapes between characters included in the predetermined characters. However, the inventive concept is not limited thereto.

For example, the set of preset characters may be a set of numbers 0 to 9, a set of alphabets A to Z, or the like. The character may include all visual symbol systems such as Hangul, Alphabet, Chinese characters, Roman characters, or numbers. The set of predetermined characters is not limited thereto.

In the above-described embodiment, characters may be read out step by step according to the hierarchical structure in which a set of numbers 0 to 9 is hierarchically classified the plurality of groups configured of the main groups and the sub groups. In the hierarchical structure, the set of numbers 0 to 9 may be classified into the plurality of groups based on similarity of shape of each of numbers 0 to 9.

The character determination unit 220 may compare any one of the number of character pixels the number of background pixels, and a ratio of the number of character pixels to the number of background pixels of a predetermined location of a character image with a reference value according to each of hierarchical layers in the hierarchical structure and read out a character image based on a comparison result when the character image is read out step by step according to the hierarchical structure.

In an embodiment, when the character determination unit 220 determines the character, the character determination unit 220 may determine the character using at least one template. For example, the character determination unit 220 may determine the character by placing the template at a predetermined area on the character image according to a control signal of the controller 120, and checking pixel values of pixels included in the template at the predetermined area and proximities in lateral and longitudinal directions between character pixels at the predetermined area. The proximities in the lateral and longitudinal directions may be checked by the number of background pixels between two sets of character pixels at different locations.

The character determination 220 may use a plurality of templates having different sizes to read out characters included in a set of predetermined characters. The character determination unit 220 may use various tablets stored in the memory 150 according to sizes and kinds of characters.

When the character determination unit 220 reads out the character, the character determination unit 220 may apply a plurality of templates according to the hierarchical structure.

According to the above-described embodiments, the character recognition apparatus 200 may read out the character image step by step according to the hierarchical structure in which the set of predetermined characters is hierarchically classified into the plurality of groups configured of the main groups and the sub groups, and thus can accurately and rapidly recognize the characters included in the medium.

Figure 3:
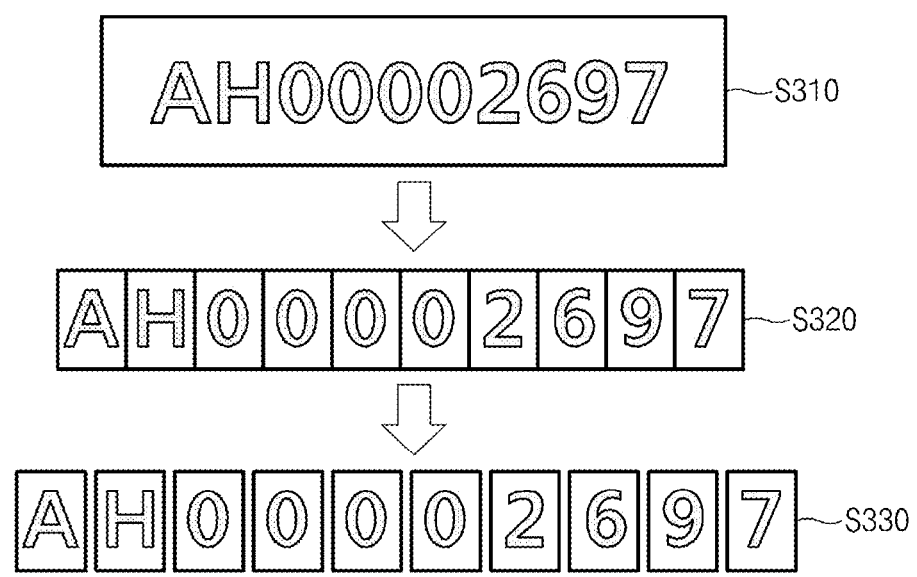
FIG. 3 is a flowchart illustrating a method of acquiring a character image of an individual character from an image of a medium according to an embodiment of the inventive concept.

FIG. 3 is a flowchart illustrating a method of acquiring a character image of an individual character from an image of a medium according to an embodiment of the inventive concept. Referring to FIG. 3, the method of FIG. 3 is configured of operations in which a process of acquiring a character image of an individual character from an image of a medium is time-sequentially processed in the character recognition apparatus 200 illustrated in FIGS. 1 and 2. Therefore, even when description for portions of FIG. 3 is omitted below, the description for the character recognition apparatus 200 as illustrated in FIG. 2 may be applied to the method of FIG. 3.

In Operation 310, the image acquisition unit 210 acquires an image of a medium. At this time, the image acquisition unit 210 may acquire not the whole image of the medium but a partial image of the medium. At this time, the partial image of the medium may be acquired by obtaining an image of a portion of the medium or by obtaining the whole image of the medium and extracting a partial image from the whole image of the medium. FIG. 3 exemplarily illustrates that one partial image for the medium is acquired from the medium.

Since a location of an image (the whole image or a partial image) of the medium to be acquired by the image acquisition unit 210 is previously determined according to a kind of medium, the image acquisition unit 210 may acquire the image of the medium using a location in which characters determined according to the kind of the medium is printed.

For example, the memory 150 may store coordinate information for locations of an image of a medium to be acquired. Further, since a size of the medium is changed according to the kinds of various media, the memory 150 may store coordinate information according to the kinds of various media.

Thus, the image acquisition 210 may acquire the image of the medium with reference to coordinate information stored in the memory 150. In Operation 320, the image acquisition unit 210 acquires a character string image form the acquired image of the medium. The image acquisition unit 210 may acquire the character string image by performing image correction on the acquired image of the medium. The character string image may include at least one character.

The image correction may include any one of removing top and bottom margins and left and right margins surrounding the character string from the acquired image of the medium, inverting color of the acquired image of the medium, or equalizing sizes of characters having different sizes from each other included in the acquired image of the medium.

In Operation 330, the image acquisition unit 210 acquires character images of individual characters from the character string image of the medium.

Sizes of the character images of the individual characters may be determined to a preset size. The preset size may be changed according to the kind of a medium recognized by the character recognition apparatus 200. For example, when the character recognition apparatus 200 recognizes a serial number of the 10,000 won Korean bill, the size of the character image may be determined to a size of a font of the serial number of the 10,000 won Korean bill.

The image acquisition unit 210 may divide the character string image into a character image having a predetermined size according to the characters using a margin between characters. The image acquisition unit 210 may represent each of the character images as an image having a predetermined size configured of a plurality of pixels. For example, the image acquisition unit 219 may perform image processing of magnifying or reducing the character image of the individual character to a constant size, image processing of dividing the character image into a plurality of pixels, or the like.

Thus, the image acquisition unit 210 may acquire the character images of the individual characters corresponding to the number of characters included in the character string image.

Figure 4:
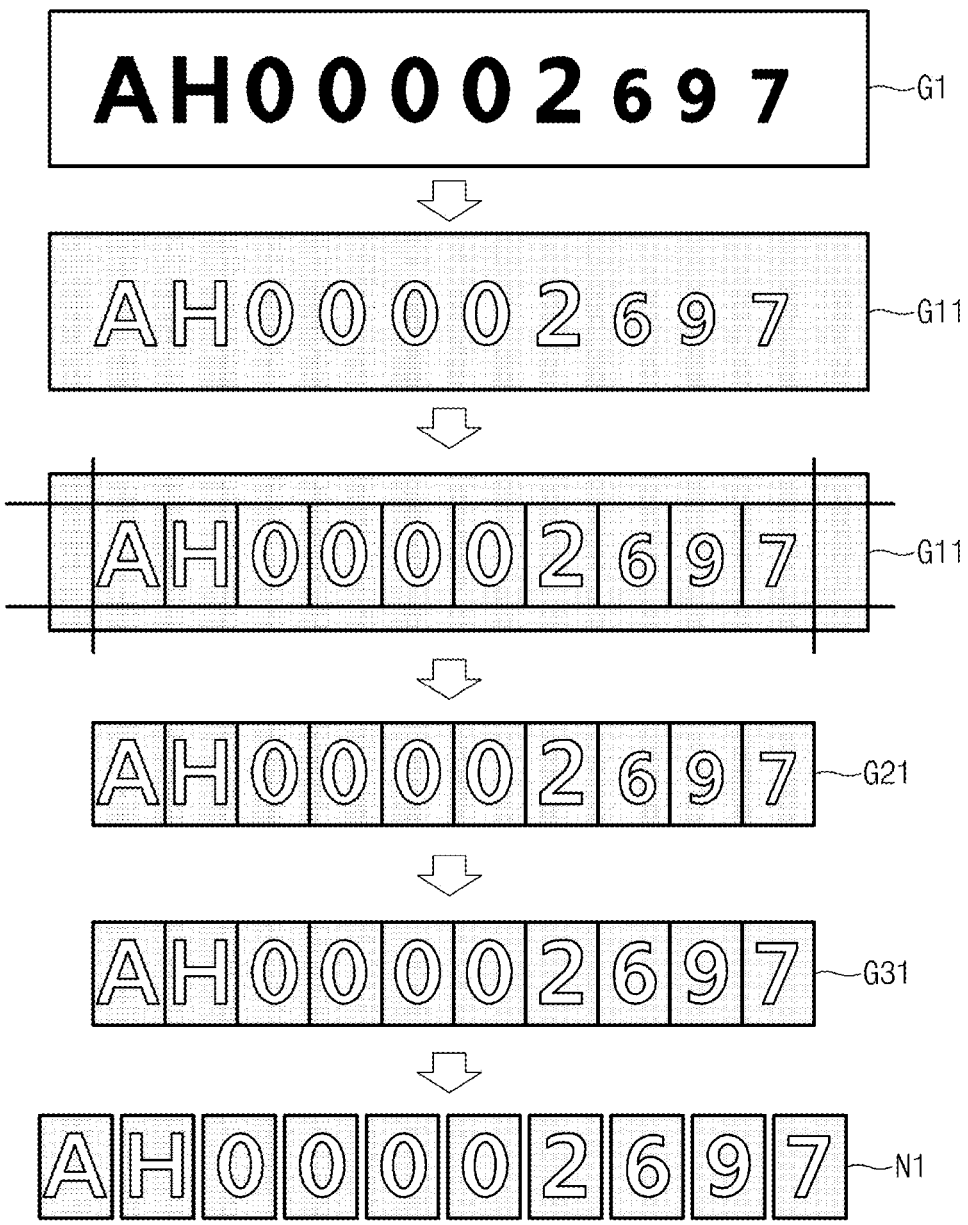
FIG. 4 is a view explaining a method of acquiring a character image of an individual character from an image of a medium according to another embodiment of the inventive concept.

FIG. 4 is a flowchart illustrating a method of acquiring a character image of an individual character from the image of the medium according to another embodiment of the inventive concept.

In the embodiment, an example, in which the image acquisition unit 210 acquires the whole image of a medium, brings location information of a partial image of the medium to be acquired from the memory 150 to acquire a region defined by the location information, that is, a first character group image G1, and acquires a character string image from the first character group image G1, will be described.

The image acquisition unit 210 primarily acquires the first character group image G1 from the acquired whole image of the medium. FIG. 4 exemplarily illustrates that the image acquisition unit 210 acquires one first character group G1.

In general, a location in which characters are printed in the medium is previously determined. Four pieces of coordinate information of the first character group image G1 to be acquired according to a size of the medium are previously stored in the memory 150. That is, the four pieces of coordinate information have been stored to acquire one first character group image G1.

Since a size of the medium is different according to a kind of the medium, the location in which characters are printed is different according to the size of the medium. Therefore, coordinate information according to the size of the medium may be stored in the memory 150. In an embodiment, a length value for determining a size of an image to be acquired together with two pieces of coordinate information may be stored in the memory 150.

Therefore, when the image of the medium is recognized, four vertex coordinates of the recognized image is determined, and the first character group image G1 is acquired using the coordinate information of the first character group image G1 corresponding to the determined four vertex coordinates.

The first character group G1 may be acquired by cutting the region defined by the coordinate for acquisition of the first character group image G1 in the image of the medium.

The acquired first character group G1 includes a plurality of characters, and hereinafter, a case, in which the kinds of characters are different, and sizes of the characters are different, will be exemplarily described. An example in which the kinds of the characters are Alphabet and number will be described.

The acquired first character group image G1 includes a character and background information other than the character. At this time, a background color of the first character group image G1 may be a color of the medium, and a color of the character may be black.

The image acquisition unit 210 acquires the character string image by correcting the first character group image G1.

First, the image acquisition unit 210 acquires a first group image G11 by inverting a color of the acquired first character group G1. In the first group image G11, for example, a color of the character is white, and the background is black.

The image acquisition unit 210 performs a segmentation process of removing an unnecessary background from the color-inverted first group image G11.

The image acquisition unit 210 may perform the segmentation process through the following method.

The image acquisition unit 210 classifies the first group image G11 into pixels, and calculates sums of gray values in row units which are sums of gray values of pixels in a lateral direction. Next, the image acquisition unit 210 compares the sums of the gray values in the rows, and removes a top margin and a bottom margin on the basis of two points in which a difference between the sums of the gray values in row units between adjacent two rows is the largest.

Similarly, the image acquisition unit 210 classifies the first group image G11 into the pixels, and calculates sums of gray values in column units which are sums of gray values of pixels in the longitudinal direction. The image acquisition unit 210 calculates two points in which a difference between the sums of the gray values in column units between adjacent two columns is the largest, and removes a left margin and a right margin on the basis of the two points located in both the outermost sides. Thus, the left margin and the right margin of the first group image G11 may be removed.

Finally, an unnecessary margin-removed second group image G21 may be acquired.

However, the area of the cut margin is merely exemplary for convenience of description, and an actual cut margin may be changed according to the medium. This is because the point having the largest difference between the sums of the gray value is changed according to a scanning state, and the cut point may be the same location as a boundary of a character or a location spaced from the boundary of the character.

A third group image G31 is acquired by correcting the second group image G21 so that fonts are to be equalized in the second group image.

Gray values of the pixels of the character in the longitudinal direction are added. When the sums of the gray values in the characters are represented on a graph, each of characters has one or more maximum values and two minimum values. A distance between the two minimum values is an expected lateral size of the character.

After the lateral size of each character is calculated, gray values of pixels of each character are added. The point having the largest difference in the gray value between adjacent two rows is calculated by comparing the gray values in the row. When the sums of the gray values in the characters are represented on a graph, each of characters has one or more maximum values and two minimum values. A distance between the two minimum values is an expected longitudinal size of the character.

The lateral size and the longitudinal size in each of the acquired characters may be different from each other. Therefore, the character is corrected using bilinear interpolation so that the longitudinal and lateral sizes are constant (a size of a reference character).

The size of the reference character may be stored in the memory 150 or may be selected to a size of any one character among the characters included in the character group. As an example, the size of the reference character may be determined on the basis of a character having the smallest size.

The image acquisition unit 210 may use the third group image G31 acquired through the above-described process as the character string image.

That is, the character image may be acquired through operation of inverting the color of the first character group image G1, operation of performing segmentation for removing an unnecessary background from the color-inverted first group image G11, and operation of equalizing the sizes of the characters.

In the embodiment, before and after the equalizing of the sizes of the characters, imaging sharpening for sharpening the image of the character may be further performed.

The image acquisition unit 210 acquires the character string image, that is, a character image N1 of an individual character in the third group image G31. The image acquisition unit 210 may acquire the character image N1 of the individual character through a segmentation process on the character string image.

The image acquisition unit 210 may further perform a process of inverting a color of the character image N1 of the individual character obtained after the segmentation process. Therefore, as an example, a color of a character in the character image N1 of the finally acquired individual character is black, and a color of the background is white. However, the inversion process may not be performed after the segmentation process.

In the embodiment, operation of equalizing character sizes may not be performed, the character image N1 of the individual character may be acquired by cutting the second group image G21. At this time, sizes of the acquired character images may be different, and one or more among sizes, shapes, and the number of the templates may be different.

Figure 5:
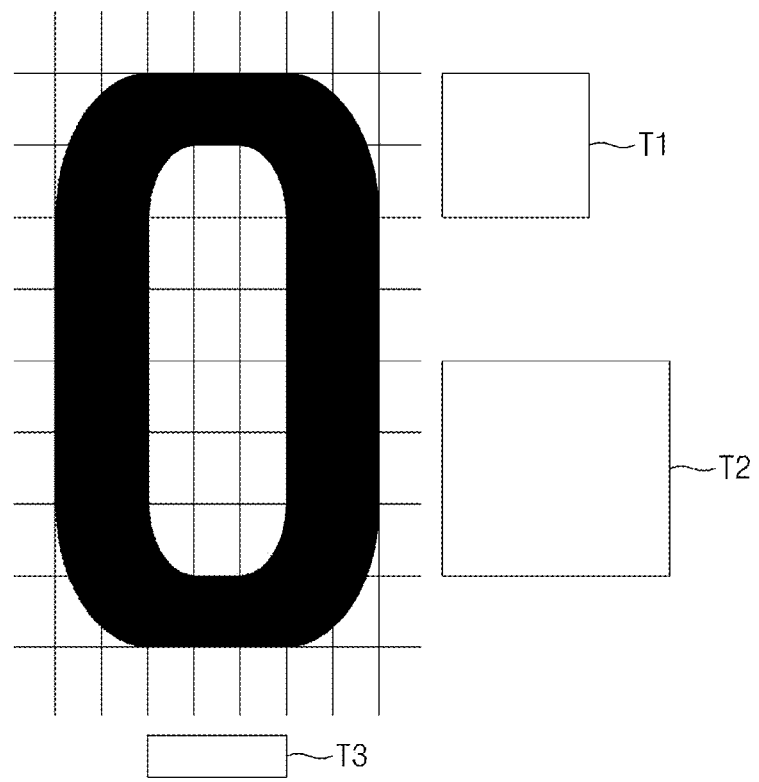
FIG. 5 is a view explaining a method of determining a character using a template according to an embodiment of the inventive concept.

FIG. 5 is a view explaining a method of determining a character using a template according to an embodiment of the inventive concept.

The character determination unit 220 receives the character image N1 of the individual character form the image acquisition unit 210 to determine the individual character. The character determination unit 220 may compare the acquired character image N1 of the individual image with the information stored in the memory 150 to determine the individual character. At this time, the character image N1 of the individual character may be classified into a plurality of pixels. The character determination unit 220 may determine character information with respect to the character image N1 of the individual character classified into the plurality of pixels using the preset template.

The template has a larger size than one pixel. Thus, the size of the template may be equal to a size in which two or more pixels are added, and as illustrated in FIG. 5, a plurality of templates T1 to T3 for determining the individual characters may be included, and sizes of the plurality of templates may be different. The plurality of templates may be previously generated by considering fonts of characters printed on the medium and stored in the memory 150. The shape or the number of templates may be different according to a kind of character or medium.

In the embodiment, the template is not a conventional template in which pixel values are set to pixels in a region having a size configured of the predetermined number of pixels but a modified template in which only a region having a predetermined region configured of pixels having a predetermined size is defined, and the pixel values of the pixels are not set. That is, the modified template may have a window shape having a predetermined size configured of the predetermined number of pixels.

For example, a shape of a template for determining the number and a shape of a template for determining a character may be different. Alternatively, the shape of the template for determining the number and the shape of the template for determining a character may be partially the same and partially different. Further, the number of the template for determining the number and the shape of the template for determining a character may be different.

However, since a kind of character is not seen before the character is not determined, the template for determining the number is first used and then the template for determining a character may be used, or the templates may be used in a reverse order.

The character determination unit 220 may select a specific template and check pixel values of pixels located in the selected template after the selected template is located on the character image of the individual character classified into a plurality of pixels. At this time, a pixel in which the specific template is first located may be previously determined or changed.

The character determination unit 220 may determine a character while moving a specific template on a character image of the individual character, and after a determination process of a specific character using the specific template is performed, the character determination unit 220 may perform a determination process of the specific character using a next template. That is, in the embodiment, the character determination process may be performed several times. A kind or the number of characters which is a target for determination in each process may be different. Alternatively, the character determination unit 220 may determine the character sequentially using the plurality of template.

In this way, the character determination unit 220 primarily determines one individual character using the plurality of templates, and then determines next one character after the determination for the one individual character is completed.

As another example, the character determination unit 220 may determine the character using a color of a plurality of pixels in a character image of an individual character classified into the plurality of pixels. The character determination unit 220 may determine the character by comparing the information stored in the memory 150 with the color of the pixels. For example, when number 0 is to be determined, plurality of pieces of number information are previously acquired and stored in the memory and the character determination unit 220 may determine whether or not number 0 coincides with any one among the number information.

The character determination unit 220 may secondarily determine non-determined characters.

As an example, the character determination unit 220 may secondarily determine non-determined characters using the same method as a method of primarily determining a character by extracting portions of a plurality of templates stored in the memory 150.

As an example, the character determination unit 220 may secondarily determine non-determined characters using second template which is a different kind of the primarily applied templates and is stored in the memory 150.

Further, the character determination unit 220 may thirdly re-determine a portion of individual characters among primarily determined characters. The character determination unit 220 may thirdly re-determine a character by extracting portions of the total characters. The thirdly determining of the character is performed to accurately determine a character which is error-prone. The error-prone character may be determined by several experiments and previously stored in the memory 150.

For example, the error-prone character may be number "8" and Alphabet "B". When the character determined as the error-prone character is "8", since the Alphabet "B" may be erroneously determined as "8", the character determination unit 220 thirdly determines the character.

In the thirdly determining of the character, the same template as or a different template from the template used in operation of firstly determining a character or operation of secondarily determining a character may be used.

In the embodiment, after the character determination unit 220 firstly determines a character, the character determination unit 220 may not determine whether or not the determination is accurately made for all the firstly determined characters, but the character determination unit may extract error-prone characters among the firstly determined characters, and determine whether or not erroneous determination is made with respect to only extracted characters. Therefore, the time for determining the character may be shortened.

At this time, operation of secondarily determining a character or operation of thirdly determining a character may be omitted.

In the embodiment, since the process of correcting a character group image and several processes of determining a character are performed, the character can be accurately recognized even when quality of the acquired image of the medium is poor.

Figure 6:
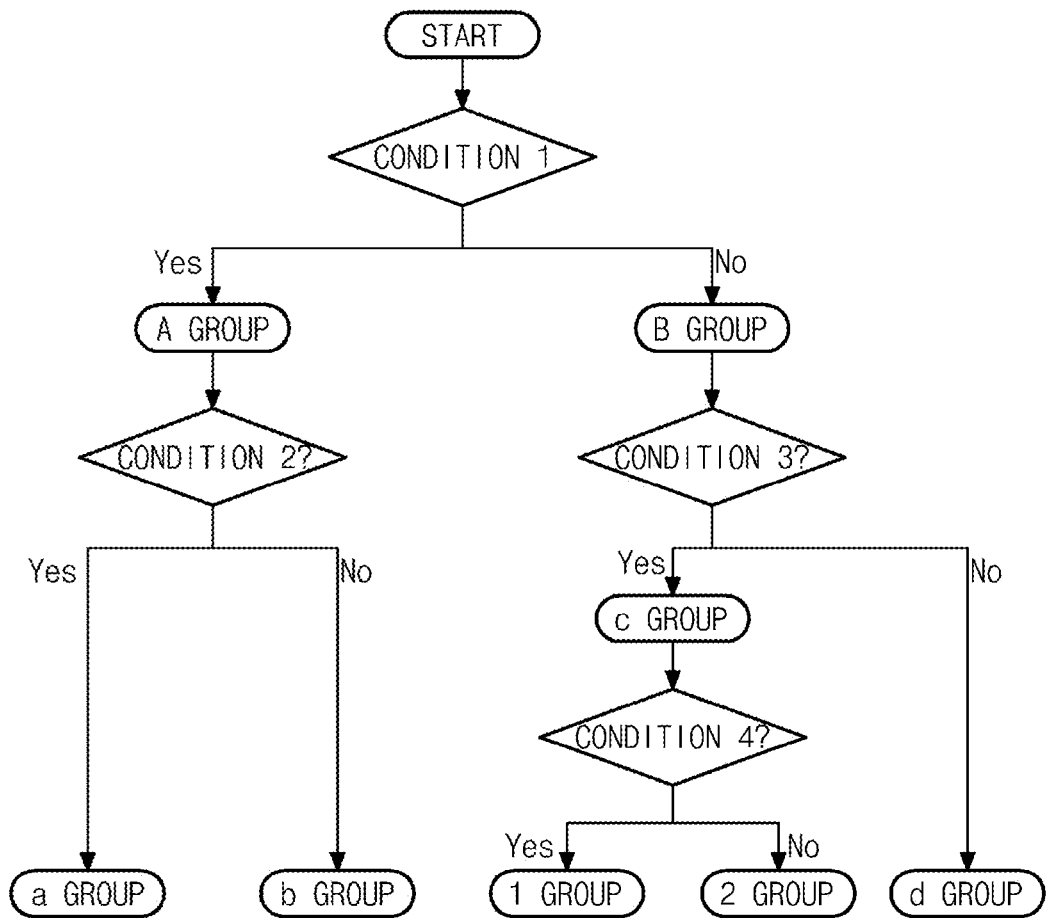
FIG. 6 is view explaining a method of determining a character by reading the character according to a hierarchical structure by a character recognition apparatus according to an embodiment of the inventive concept.

FIG. 6 is a view illustrating a method of determining a character by reading out the character image according to a hierarchical structure in the character recognition apparatus.

The method of reading out the character image illustrated in FIG. 6 may be time-sequentially performed in the character recognition apparatus 200 illustrated in FIG. 1 or 2. Therefore, even when description for portions of FIG. 6 is omitted below, the description for the character recognition apparatus 200 as illustrated in FIG. 1 or 2 may be applied to the method of FIG. 6

After a character image of an individual character is acquired in the image acquisition unit 210, when the character image is input to the character determination unit 220 from the image acquisition unit 210, the character determination unit 220 read out the character image step by step according to the hierarchical structure. The hierarchical structure illustrated in FIG. 6 is merely exemplary, and the person having ordinary skilled in the art would understand that various hierarchical structures other than the hierarchical structure of FIG. 6 may be applied.

The hierarchical structure hierarchically classifies a set of predetermined characters into a plurality of groups configured of main groups and sub groups, and characters included in the main group includes characters included in a sub group of a corresponding main group. The hierarchical structure may be previously generated in an external apparatus and then stored in the memory 140 to be used. Hereinafter, for convenience of description, it is assumed and described that the hierarchical structure is generated in one processor as an external apparatus. The processor may generate the hierarchical structure through the following method.

First, a "condition 1" which is a criterion for grouping the set of predetermined characters into uppermost main groups is determined. For example, the "condition 1" may be determined based on similarity of shapes between characters included in the set of predetermined characters.

The processor classifies the set of predetermined characters according to the "condition 1". Thus, characters satisfying the "condition 1" may be grouped into an "A group", and characters not satisfying the "condition 1" may be grouped into a "B group".

Next, the characters included in the uppermost main groups may be grouped into sub groups according to a predetermined criterion. For example, based on shapes of the characters included in the groups, conditions which are criterions for grouping the characters included in the groups into the sub groups are determined, and then the characters included in the groups are classified according to the determined conditions. Referring to FIG. 6, the characters of the "A group" are classified according to a "condition 2" to group characters satisfying the "condition 2" into an "a group" among the characters included in the "A group", and characters not satisfying the "condition 2" into a "b group". The characters of the "B group" are classified according to a "condition 3" to group characters satisfying the "condition 3" into an "c group" among the characters included in the "B group", and characters not satisfying the "condition 3" into a "d group".

Further, the sub groups may be further classified according to a predetermined criterion. Referring to FIG. 6, the characters of the "c group" are classified according to a "condition 4" to further classify the "c group" into "1 group" and "2 group". Thus, among the characters included in the "c group", characters satisfying the "condition 4" are grouped into a "1 group", and characters not satisfying the "condition 2" are grouped into a "2 group".

In the embodiment, when a hierarchical structure is generated with respect to a set of numbers 0 to 9, the hierarchical structure may hierarchically group numbers having a similar shape among numbers 0 to 9 into a plurality of groups configured of main groups and sub groups.

First, according to a predetermined condition, the set of numbers 0 to 9 may be divided into the "A group" including the numbers 1 and 7 and the "B group" including numbers 0, 2, 3, 4, 5, 6, 8, and 9. Next, when the "A group" including number 1 and 7 and the "B group" including numbers 0, 2, 3, 4, 5, 6, 8, and 9 are further classified, the "A group" may be further divided into the "a group" including number 1 and the "b group" including number 7, and the "B group" may be further divided into the "c group" including number 2, 5, and 6 and the "d group" including number 0, 3, 4, 8, and 9. The "c group" including number 2, 5, and 6 may be further grouped into lower group, that is, the "1 group" including numbers 2 and the "2 group" including numbers 5 and 6.

The character determination unit 220 read out the input image using the generated hierarchical structure as described above to determine a character. According to the hierarchical structure, the character determination unit 220 applies a first template to the input character image to determine whether or not the input character image satisfies the "condition 1". When the input character image satisfies the "condition 1", it is determined that the character included in the input character image corresponds to the "A group" and when the input character image does not satisfy the "condition 1", it is determined that the character included in the input character image corresponds to the "B group".

Next, when the character image corresponds to the "A group", the character determination unit 220 applies a second template to the character image to determine whether or not the character image satisfies the "condition 2". When the character image corresponds to the "B group", the character determination unit 220 applies a third template to the character image to determine whether or not the input character image satisfies the "condition 3".

With reference to FIG. 6, when the character image corresponds to the "A group" and the character image satisfies the "condition 2", it is determined that the character image correspond to the "a group". When the character image corresponds to the "B group" and the character image satisfies the "condition 3", the character determination unit 220 applies a fourth template to the character image to determine whether or not the character image satisfies the "condition 4". When the character image satisfies the "condition 4", the character determination unit 220 determines that the character image is included in the "1 group", and when the character image does not satisfy the "condition 4", the character determination unit 220 determines that the character image is included in the "2 group".

In this way, the character determination unit 220 may apply the templates to hierarchical layers of the hierarchical structure to hierarchically read out the input character image according to the hierarchical structure and to determine the character. The character determination unit 220 may compare any one of the number of character pixels the number of background pixels, and a ratio of the number of character pixels to the number of background pixels of a predetermined location of a character image with a reference value according to each of hierarchical layers in the hierarchical structure and read out a character image based on a comparison result step by step as illustrated in FIG. 6.

For example, the "condition 1" to the "condition 4" may be whether the number of character pixels in a predetermined range at a predetermined area is equal to and larger than a reference value. Alternatively, the "condition 1" to the "condition 4" may be whether the ratio of the number of character pixels to the number of background pixels is equal to and larger than the reference value.

The character determination unit 220 may read output the image character using the hierarchical structure of FIG. 6, and determine a group in which the character image is included among the groups illustrated in FIG. 6 based on a read-out result. The character determination unit 220 may determine the character of the character image to one of characters included in the determined group. In an embodiment, the character determination unit 220 may determine the corresponding character of the character image to the one character in a corresponding group using at least one template.

Thus, when the character recognition apparatus 200 reads out the character image to determine the character, the character recognition apparatus 200 does not determine the character by applying all templates and comparing all pixels of character images of the individual characters. In an embodiment, since the character recognition apparatus 200 determines the character by narrowing the group in which the character is included to the sub groups according to whether or not pixels of a partial region of a predetermined area in each of hierarchical layer satisfy a preset condition according to the hierarchical structure configured of the main groups and sub groups, the character recognition apparatus 200 considerably reduce comparison targets, the number of pixels to be compared, to determine characters to rapidly recognize the character of the character image.

FIG. 7 is a view explaining a character image according to an embodiment of the inventive concept. Description made below may be applied to the character recognition apparatus illustrated in FIGS. 1 and 2.

Referring to FIG. 7, a character image of an individual character is illustrated. The character image of FIG. 7 includes a character portion and a remaining background portion other than the character. That is, the character image includes character pixels occupied by the character portion and background pixels occupied by the background portion. The background pixels may be determined as pixels having pixel values equal to and larger than a predetermined pixel value, and the character pixels may be determined as pixels having pixel values equal to and smaller than the predetermined pixel value, among the pixels constituting the character images.

For example, the character recognition apparatus 200 recognizes the character using the hierarchical structure in which a set of predetermined characters are hierarchically classified into the main groups and the sub groups based on similarity of locations and configurations between the character pixels and the background pixels in the character image of each of characters included in the set of predetermined characters. The character recognition apparatus 200 may read out the character image of a medium thrown therein step by step using the hierarchical structure.

Figure 8:
FIG. 8 is a view explaining an example of determining a character of a medium using a hierarchical structure in a character recognition apparatus according to an embodiment of the inventive concept.

FIG. 8 is a view explaining an example of determining a character of a medium using a hierarchical structure in a character recognition apparatus according to an embodiment of the inventive concept.

When a paper money is thrown into the character recognition apparatus 200, the image acquisition unit 210 acquires an image of a portion of the paper money in which a serial number 10 is printed. After the image acquisition unit 210 acquires the image of the of the paper money in which the serial number 10 is printed, the image acquisition unit 210 cuts top and bottom margins and left and right margins from the acquired image to acquire a character string image including a character string of the serial number 10.

The image acquisition unit 210 divides the character string image in units of characters of the serial numbers 10 to acquire a character image of an individual character. In the paper money illustrated in FIG. 8, total ten character images are obtained. The total ten character images acquired in the image acquisition unit 210 are sequentially transferred to the character determination unit 220 to be read out.

In the serial number 10 of the paper money, a kind of character in each of digits of the serial number is determined according to a kind of medium and a kind of bill. In the paper money illustrated in FIG. 8, Alphabets are located in first and second digits of the serial number 10, and the numbers are located in other digits.

Thus, the character determination unit 220 reads out the input character image step by step using a hierarchical structure in which a set of Alphabets A to Z are hierarchically classified into a plurality of groups configured of main groups and sub groups with respect to the first and second digits of the serial number 10, and reads out the input character image step by step using a hierarchical structure in which a set of numbers 0 to 9 are hierarchically classified into a plurality of groups configured of main groups and sub groups with respect to remaining digits.

When the character recognition apparatus 200 recognizes the charge image of number, the character recognition apparatus 200 reads out the character image step by step using the hierarchical structure of a number set. When the character recognition apparatus 200 recognizes the charge image of Alphabet, the character recognition apparatus 200 reads out the character image step by step using the hierarchical structure of an Alphabet set.

When the character recognition apparatus 200 reads out the charge image of specific Alphabet using the hierarchical structure of a number set, the character determination unit 220 determines a specific alphabet as a specific number.

For example, the character determination unit determines Alphabet E as number 2 when the character determination unit reads out a character image of Alphabet E using the hierarchical structure of a number set. In another example, the character determination unit determines Alphabet E, C, or K as any one of numbers 5, 6, and 2 when the character determination unit reads out a character image of number 8 using the hierarchical structure of a number set. In another example, the character determination unit determines Alphabet A, B, D, H, or J as any one of numbers 3, 4, 8, and 9 when the character determination unit reads out a character image of number 8 using the hierarchical structure of a number set.

On the contrary, the character determination unit determines number 8 as Alphabet B when the character determination unit reads out a character image of number 8 using the hierarchical structure of an Alphabet set.

In an embodiment, an example in which the character recognition apparatus 200 recognizes a serial number of a Chinese bill will be described. First, the character recognition unit 200 acquires a character string image of the serial number from the Chinese bill, and then acquires the character image of each of characters located in each of digits of the serial number.

The character recognition apparatus 200 reads out the character image step by step according to a hierarchical structure to determine a character, in which a set of predetermined characters allocated to each of digits of the serial number of the Chinese bill is hierarchically classified into the plurality of groups configured of main groups and sub groups.

In the Chinese bill, numbers 0 to 9 are located in the last digit of the serial number. In contrast, in Korean bill, Alphabets A to Z are located in the last digital of the serial number.

Thus, when a Chinese bill which is edited by replacing a serial number of a Korean bill in location of a serial number of the Chinese bill is recognized through the character recognition apparatus 200 configured to recognize a Chinese bill, the character recognition apparatus 200 may recognize a character of the last digit of the serial number of the edited Chinese bill not as Alphabet but number.

At this time, the character determination unit 220 determines a specific alphabet as a specific number when the character determination unit 220 reads out a character image of the specific alphabet for recognizing the serial number of the Chinese bill. For example, the character determination unit 220 determines Alphabet E as number 2 when the character determination unit 220 reads out a character of the last digit of the serial number of the Chinese bill is Alphabet E.

In the above-described embodiment, as an image of the serial number of a Korean bill with which a serial number of the Chinese bill is replaced, the character image of the FIG. 7 may be used. A font and a font size of the serial number in the character image are a font and a font size used in the Korean bill.

In the above-described embodiment, the case in which an Alphabet character of the serial number of the Korean bill is replaced on a digit of a number character of the serial number of the Chinese bill has been described. However, the inventive concept is not limited thereto. An character of a serial number of a second country's bill may be replaced on a character digit of a serial number of the first country's bill.

Thus, in a state in which the Alphabet character of the serial number of the second country's bill is replaced on a number character digit of the serial number of the first country's bill, after the character image of an individual character is acquired from the first country's bill by the image acquisition unit 210, when the individual character is determined from the character image of the individual character in the character determination unit 220, the character determination unit 220 may determine an alphabet character of the serial number of second country as number of portions of a set of numbers including 0 to 9 or a number in the set including numbers.

In the above-described embodiments, the character determination unit 220 may perform determination of the character on different media a predetermined number of times or more. When the character determination unit 220 determines the character on the different media predetermined number of times or more, the predetermined Alphabet character of the same digit of different media is determined in the set of the predetermined number characters. Here, the set of the predetermined number characters may be any one of the main groups and the sub groups.

For example, the same digit of the different media may be the last digit of the serial number. At this time, when the predetermined character of the last digit comprises Alphabet E, K, or C, the set of the predetermined number characters may comprise 5, 6, and 2. As another example, when the predetermined character of the last digit comprises Alphabet E, the set of the predetermined number characters may comprise 2. As another example, when the predetermined character of the last digit comprises Alphabet A, B, D, H, or J, the set of the predetermined number characters may comprise 3, 4, 8, and 9. As another example, when the predetermined character of the last digit comprises Alphabet L, the set of the predetermined number characters may comprise 1 and 7.

In this way, the character recognition apparatus 200 determines the character of the different media by applying the predetermined hierarchical structure every kind of media, kind of bill, digit of a corresponding character.

Figure 9:
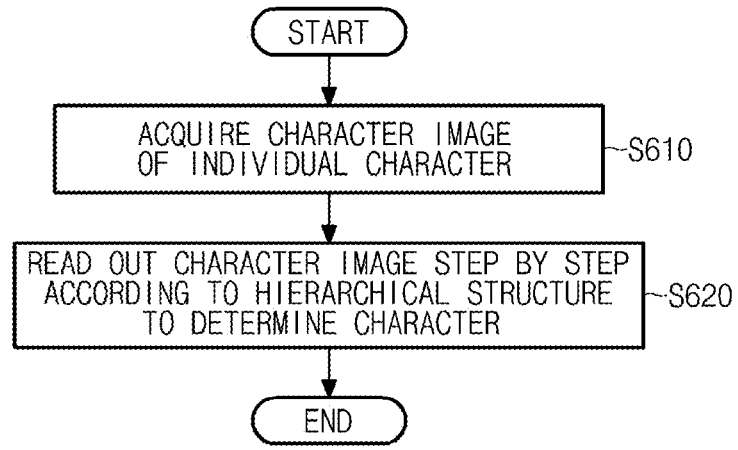
FIG. 9 is a flowchart illustrating a character recognition method of determining a character of a medium according to an embodiment of the inventive concept.

FIG. 9 is a flowchart illustrating a character recognition method for determining a character of a medium according to an embodiment of the inventive concept. Referring to FIG. 9, the method illustrated in FIG. 9 includes operations time-sequentially processed in the character recognition apparatus 200 as illustrated in FIGS. 1 and 2. Therefore, even when description for portions of FIG. 9 is omitted below, the description for the character recognition apparatus 200 as illustrated in FIGS. 1 and 2 may be applied to the method of FIG. 9.

In operation S610, the image acquisition unit 210 acquires a character image of an individual character. For example, the image acquisition unit 210 may acquire the character image using light.

In operation S620, the character determination unit 220 reads out the character image step by step according to a hierarchical structure. The hierarchical structure hierarchically classifies a set of predetermined characters into a plurality of groups consisting of main groups and sub groups, and the set of predetermined characters may be a set of numbers 0 to 9, a set of Alphabets A to Z, and the like. The character determination unit 220 may determine a character of the character image using at least template according to kinds of characters included in the set of predetermined characters.

Figure 10:
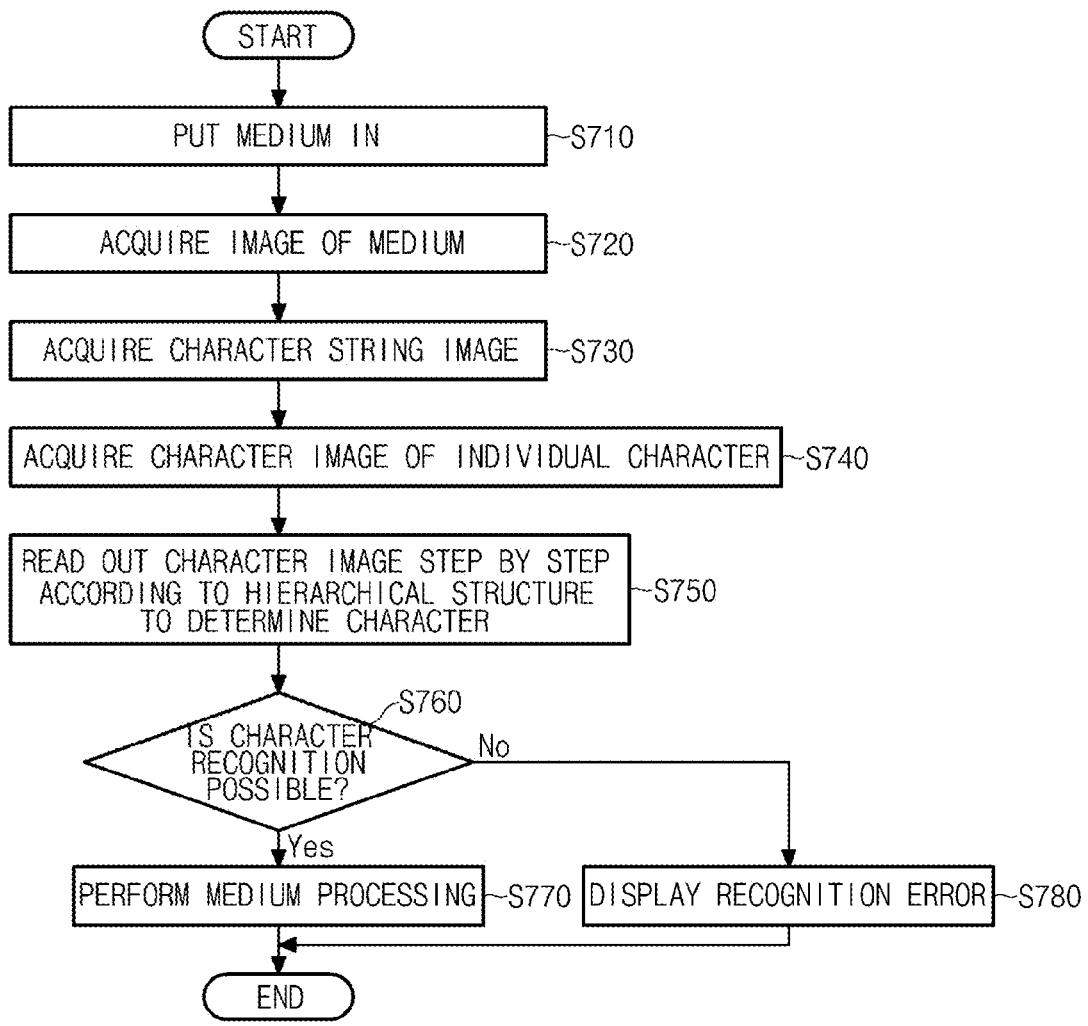
FIG. 10 is a flowchart illustrating a character recognition method of determining a character of a medium according to another embodiment of the inventive concept.

FIG. 10 is a flowchart illustrating a character recognition method of determining a character of a medium according to another embodiment of the inventive concept. Referring to FIG. 10, the method illustrated in FIG. 10 includes operations time-sequentially processed in the character recognition apparatus 200 as illustrated in FIGS. 1 and 2. Therefore, even when description for portions of FIG. 10 is omitted below, the description for the character recognition apparatus 200 as illustrated in FIGS. 1 and 2 may be applied to the method of FIG. 10.

In operation S710, the character recognition apparatus 200 receives a medium put therein through the medium input/output unit 110.

In operation S720, the image acquisition unit 210 acquires an image of a medium. The image acquisition unit 210 may acquire only an image of a specific portion of the medium not the whole image of the medium.

In operation S730, the image acquisition unit 210 acquires a character string image. For example, the image acquisition unit 210 may acquire the character string image including at least one character by performing image processing of removing a margin.

In operation S740, the image acquisition unit 210 acquires a character image of an individual character. For example, the image acquisition unit 210 may divide the character string image into a character image having a predetermined size in units of characters through image processing.

In operation S750, the character determination unit 220 reads out the character image step by step according to a hierarchical structure to determine a character. For example, the character determination unit 220 may the character of the character image as one among characters included in a determined group, when the group in which the character image is included is determined among the plurality of groups according to a read-out result.

In Operation S760, the character determination unit 220 determines whether or not the character of the input character image is recognized and transmits a determination result to the controller 120. In operation S750, according to a result of read-out and determination of the character, when the character of the character image is determined as one among characters of the predetermined set, the process proceeds to operation S770, and when the character of the character image is not determined, the process proceeds to operation S780.

In operation S770, the controller 120 processes put-in medium according to a recognition result of the character recognition apparatus 200.

In operation S780, the user interface unit 140 displays that character recognition for the put-in medium is erroneous.

According to embodiments of the inventive concept, the character recognition apparatus 200 compares some pixels of a predetermined area to rapidly recognize the character of the character image using the hierarchical structure configured of the main groups and sub groups without comparison of total pixels of the character image.

Figure 11:
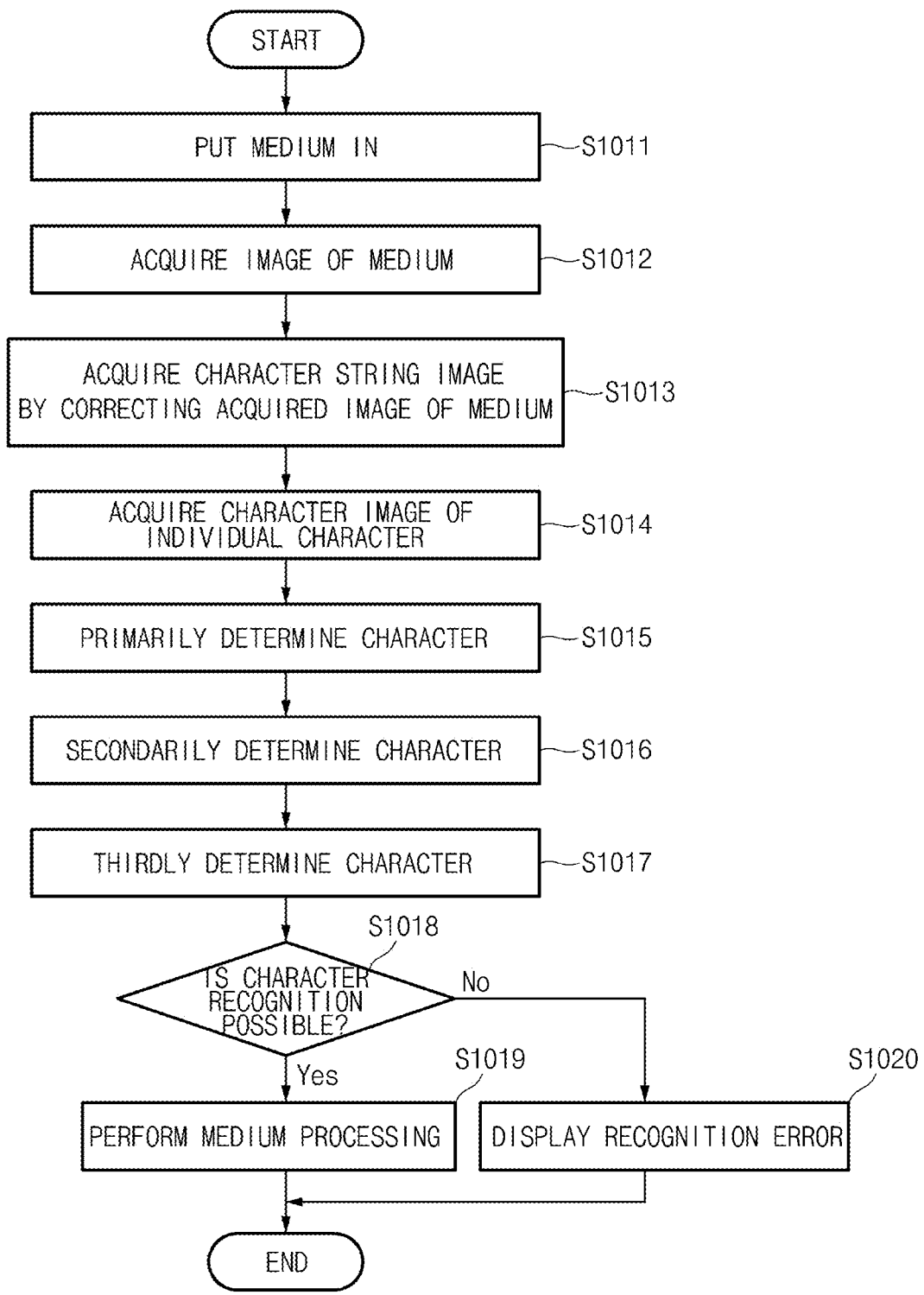
FIG. 11 is a flowchart illustrating a character recognition method of determining a character of a medium according to another embodiment of the inventive concept.

FIG. 11 is a flowchart illustrating a character recognition method of determining a character of a medium according to another embodiment of the inventive concept. Referring to FIG. 11, the method illustrated in FIG. 11 includes operations time-sequentially processed in the character recognition apparatus 200 as illustrated in FIGS. 1 and 2. Therefore, even when description for portions of FIG. 11 is omitted below, the description for the character recognition apparatus 200 as illustrated in FIGS. 1 and 2 may be applied to the method of FIG. 11.

In operation S1011, the character recognition apparatus 200 receives a medium put therein through the medium input/output unit 110.

In operation S1012, the image acquisition unit 210 acquires an image of a medium. The image acquisition unit 210 may acquire only an image of a specific portion of the medium not the whole image of the medium.

In operation S1013, the image acquisition unit 210 acquires a character string image by correcting the acquired image of the medium. For example, the image acquisition unit 210 may acquire the character string image including at least one character by performing image correction such as a process of removing a background surrounding the character string, a process of color inversion, or a process of equalizing sizes of characters.

In operation S1014, the image acquisition unit 210 acquires a character image of an individual character. For example, the image acquisition unit 210 may acquire character images of individual characters having the equalized character size, or acquires character images of individual characters having the different character sizes.

In operation S1015, the character determination unit 220 primarily determines a character. The character determination unit 220 determines a character image of an individual character using a plurality of templates. However, the inventive concept is not limited thereto. The character determination unit 220 may determine the individual character with reference to the embodiments described in FIGS. 1 to 10.

In operation S1016, the character determination unit 220 secondarily determines a character. The character determination unit 220 secondarily determines non-detected characters. As an example, the character determination unit 220 may extract portions of a plurality of templates stored in the memory 150 to secondarily determine the non-determined characters. As another example, the character determination unit 220 may secondarily determine the non-determined characters using a different kind of second template from the plurality of templates (first template) stored in the memory 150.

In operation S1017, the character determination unit 220 thirdly determines a character. The character determination unit 220 may thirdly re-determines a portion of individual characters among primarily determined characters. The character determination unit 220 thirdly determines a character to accurately determine error-prone characters. The error-prone characters may be determined by several experiments and previously stored. When the character is thirdly determined, the character determination unit 220 may determine the character using the same template as or a different kind of template from the template used in the primarily or secondarily determining the character. In operation S1018, the character determination unit 220 determines whether or not the character of the input character image is recognized and transmits a determination result to the controller 120. When the character determination unit 220 determines whether or not total characters among the determined total character is possible. According to a character determination result in operations S1015 to S1017, when the individual character is determined, the process proceeds to operation S1019, and when the individual character is not determined, the process proceeds to operation S1020.

Operation S1019 is in a state in which the total characters are recognizable, and thus the controller 120 processes put-in medium according to a recognition result of the character recognition apparatus 200.

Operation S1020 is in a state in which character recognition with respect one or more character among the determined total characters is impossible, and thus the user interface unit 140 displays that character recognition for the put-in medium is erroneous. However, the operation of the character recognition apparatus 200 when the one or more characters are not recognizable is not limited to display error occurrence of character recognition. In another embodiment, the character recognition apparatus 200 does not display error occurrence of character recognition through the user interface unit 140 but may store and manage the recognition error result.

In another embodiment, the character recognition apparatus 200 does not stop the process but perform a process on the put-in medium like operation S1019 after performing operation S1020.

According to the embodiments, characters included in the medium can be accurately and rapidly recognized.

Even though all the elements of the embodiments are coupled into one or operated in the combined state, the present disclosure is not limited to such an embodiment. That is, all the elements may be selectively combined with each other without departing the scope of the invention.

Additionally, although all components are implemented with separate hardware components, the invention can also be embodied as computer programs having program modules for performing some or all of the functions combined from one or a plurality of hardware in which some or all of the components are selectively combined. Also, functional programs, codes, and code segments for accomplishing the present invention can be easily construed by programmers skilled in the art to which the present invention pertains.) Examples of the computer readable recording medium comprise magnetic storage media (e.g., ROM, floppy disks, hard disks, etc.), optical recording media (e.g., CD-ROMs, or DVDs), and storage media such as carrier waves (e.g., transmission through the Internet).

When it is described that one comprises (or comprises or has) some elements, it should be understood that it may comprise (or include or has) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, the claimed invention is defined not by the detailed description of the invention but by the appended claims, and all differences within the scope will be construed as being comprised in the present disclosure.

What is claimed is:

1. A character recognition apparatus, comprising:
   a processor configured to:
   acquire a character image of an individual character from a medium;
   determine the individual character from the character image with a hierarchical structure in which a set of predetermined characters are hierarchically classified into a plurality of groups configured into main groups and sub groups; and
   determine whether the determined individual character matches at least one of error-prone characters,
   wherein the error-prone characters are previously stored in a memory; and
   wherein a predetermined alphabet character printed on a same position of a character of different media is determined from a set of predetermined number characters when the character recognition apparatus performs a recognition process, which acquires a character image of an individual character and determines the individual character, on a plurality of different media repeatedly.

2. The character recognition apparatus of claim 1, wherein any one of the number of character pixels, the number of background pixels, and a ratio of the number of character pixels is compared with the number of background pixels in a predetermined area of the character image with a reference value according to each of hierarchical layers in the hierarchical structure and determines the individual character based on a comparison result.

3. The character recognition apparatus of claim 1, wherein the hierarchical structure classifies the set of predetermined characters into the plurality of groups based on similarity of shapes between characters included in the set of predetermined characters.

4. The character recognition apparatus of claim 1, wherein a group among the plurality of groups is determined in which the character image is included, and the individual character of the character image is determined as one among characters included in the determined group.

5. The character recognition apparatus of claim 1, wherein the hierarchical structure hierarchically classifies numbers 0 to 9 into the plurality of groups configured of main groups and sub groups, and a specific alphabet is determined as a specific number when the character recognizer reads out a character image of the specific alphabet using the hierarchical structure.

6. The character recognition apparatus of claim 1, wherein the hierarchical structure hierarchically classifies numbers 0 to 9 into the plurality of groups configured of main groups and sub groups, and Alphabet E is determined as number 2 when a character image of Alphabet E is read out by the hierarchical structure.

7. The character recognition apparatus of claim 6, wherein the hierarchical structure hierarchically classifies Alphabets A to Z into the plurality of groups configured of main groups and sub groups, and number 8 is determined as Alphabet B when a character image of number 8 is read out by the hierarchical structure.

8. The character recognition apparatus of claim 1, wherein the individual character is determined by at least one template according to kinds of characters included in the set of predetermined characters.

9. The character recognition apparatus of claim 1, wherein the same character position of different media is a position of a last digit of a serial number, and when the predetermined Alphabet character comprises Alphabet E, K or C, the set of predetermined number characters comprises 5, 6, and 2.

10. The character recognition apparatus of claim 1, wherein the same character position of different media is a position of a last digit of a serial number, and when the predetermined Alphabet character comprises Alphabet E, the set of predetermined number characters comprises 2.

11. The character recognition apparatus of claim 1, wherein the same character position of different media is a position of a last digit of a serial number, and when the predetermined Alphabet character comprises Alphabet A, B, D, H, or J, the set of predetermined number characters comprises 3, 4, 8, and 9.

12. The character recognition apparatus of claim 1, wherein the same character position of different media is a position of a last digit of a serial number, and when the predetermined Alphabet character comprises Alphabet L, the set of predetermined number characters comprises 1 and 7.

13. The character recognition apparatus of claim 1, wherein the medium is a first country's bill on which a position of a number character of a serial number of the first country's bill is determined to be represented by an Alphabet character of a serial number of a second country's bill, and when the character recognition apparatus recognizes the medium, the Alphabet character of the serial number of the second country's bill is determined as a number in a set including one or more among numbers 0 to 9.

14. The character recognition apparatus of claim 13, wherein the character image of an Alphabet character of the serial number of the second country' bill replaced on the position of the number character of the serial number of the first country's bill includes a background pixel having a pixel value of 200 or more and a character pixel having a pixel value of 30 or less.

15. The character recognition apparatus of claim 1,
wherein the error-prone character that was previously stored in the memory is extracted from the determined individual character.

16. A financing apparatus, comprising:

a processor configured to:

deposit or withdraw a medium including characters;

acquire a character image of an individual character from the medium, and reading out the character image to determine the characters with a hierarchic structure in which a set of predetermined characters is hierarchically classified into a plurality of groups configured into main groups and sub groups;

control operations of the medium interface and the character recognition apparatus; and determine whether each of the characters determined matches at least one of error-prone characters, wherein the error-prone characters are previously stored in a memory; and wherein a predetermined alphabet character printed on a same position of a character of different media is determined from a set of predetermined number characters when the character recognition apparatus performs recognition process, which acquires a character image of an individual character and determines the individual character, on a plurality of different media repeatedly.

17. The financing apparatus of claim 16, wherein the error-prone character that was previously stored in the memory is extracted from the determined individual character.

\* \* \* \* \*